(12) United States Patent
Shimoyama

(10) Patent No.: US 7,642,009 B2
(45) Date of Patent: Jan. 5, 2010

(54) HOLDER FOR BATTERY MODULES

(75) Inventor: Yoshiro Shimoyama, Inzai (JP)

(73) Assignees: Hyundai Motor Company, Seoul (KR); Hyundai Motor Japan R&D Center Inc., Inzao, Chiba (JP); Kia Motors Corporation, Seoul (KR)

( * ) Notice: Subject to any disclaimer, the term of this patent is extended or adjusted under 35 U.S.C. 154(b) by 425 days.

(21) Appl. No.: 11/648,762

(22) Filed: Dec. 29, 2006

(65) Prior Publication Data

US 2008/0124627 A1 May 29, 2008

(30) Foreign Application Priority Data

Nov. 29, 2006 (KR) .................. 10-2006-0118837

(51) Int. Cl.
 *H01M 2/10* (2006.01)
 *H01M 6/46* (2006.01)
 *H01M 6/42* (2006.01)
 *H01M 2/04* (2006.01)

(52) U.S. Cl. .................. 429/186; 154/157; 154/176

(58) Field of Classification Search .................. 429/186, 429/153, 154, 157, 176
See application file for complete search history.

(56) References Cited

U.S. PATENT DOCUMENTS 6,410,184 B1 * 6/2002 Horiuchi et al. ............. 429/156
6,479,185 B1 * 11/2002 Hilderbrand et al. ........ 429/148
6,551,740 B1 * 4/2003 Melichar ..................... 429/120
2005/0064280 A1 3/2005 Watanabe et al.

FOREIGN PATENT DOCUMENTS

| JP | 11-111248 | 4/1999 |
|---|---|---|
| JP | 11-126593 | 5/1999 |
| JP | 2000-243366 | 9/2000 |
| JP | 2004-087218 | 3/2004 |
| JP | 2005-100841 | 4/2005 |
| JP | 1 548 858 | 6/2005 |

* cited by examiner

*Primary Examiner*—Patrick Ryan
*Assistant Examiner*—Thomas H. Parsons
(74) *Attorney, Agent, or Firm*—Morgan, Lewis & Bockius LLP

(57) ABSTRACT

A holder for battery that maintains a temperature difference between battery modules below a specific value by the shape of a module support portion including receiving recesses divided into halves to become smaller from the upstream to the downstream of cooling air flow direction so that the contact area of the cooling air between the battery modules varies. The battery modules may include a module support portion supporting a plurality of battery modules and a plurality of receiving recesses formed at regular intervals on the module support portion, on which the battery modules are placed.

6 Claims, 4 Drawing Sheets

HOLDER FOR BATTERY MODULES

CROSS-REFERENCE TO RELATED APPLICATION

This application claims the benefit of Korean Patent Application No. 10-2006-0118837, filed on Nov. 29, 2006, the entire disclosure of which is hereby incorporated by reference.

BACKGOUND OF THE INVENTION

1. Field of the Invention

The present invention relates to a holder for battery modules and, more particularly, to a holder for battery modules that maintains a temperature difference between battery modules below a specific value.

2. Description of Related Art

In general, the battery of a vehicle is a part for supplying electric power to the respective elements of the vehicle and repeats charge and discharge by loads of electronic devices and a generation unit of the vehicle. During such a process, the temperature rise of the battery causes some problems in that the internal resistance in the battery is changed, the electric performance is deteriorated and thereby efficient electricity management of the vehicle is not established.

As the development and application of hybrid vehicles and high voltage batteries such as 36V has advanced, the necessity for lowering the internal temperature of the battery to an appropriate level has been raised. For example, Japanese Patent Publication No. 2005-183343 has disclosed a battery case in which a cooling air rectifying member, a guide groove and a fin are established to uniformly cool plural battery modules mounted therein.

Moreover, there have been disclosed structures, in which a plurality of battery modules arranged horizontally is put up and down into a holder divided into halves, in Japanese Patent Publication No. 2000-223096 and Japanese Patent Publication No. 2003-331807.

However, since the shapes of the battery module support portions of the holder are generally identical to each other, there occurs a large temperature difference between the upstream and downstream of the cooling air in the respective battery modules, it is necessary to provide a large cooling fan so as to lower the temperature difference below a specific value, thus increasing the cost or the power consumption.

SUMMARY OF THE INVENTION

Embodiments of the present invention provide a holder for battery modules that maintains the temperature difference between battery modules below a specific value by designing the shape of a module support portion to become smaller so that the flow of cooling air is deviated from the upstream to the downstream without using a conventional cooling fin or cooling fan, thus reducing the cost and the power consumption remarkably, prolonging the lifetime of the battery modules and preventing fluctuations of lifetime of the battery modules.

In an exemplary embodiment of the present invention a holder for battery modules comprises a module support portion supporting a plurality of battery modules and a plurality of receiving recesses. The recesses are formed at regular intervals on the module support portion, on which the battery modules are put. The module support portions support both end portions or a front end portion, a middle portion and a rear end portion of the battery module. If the number of the battery modules exceeds a capacity that a step of the battery module can accommodate, battery modules are stacked in plural steps and then electrically and mechanically connected to one another. The width of the module support portion is decreased toward the downstream of cooling air so that a contact area between the battery module and the cooling air becomes larger from the upstream to the downstream of the cooling air.

As a further exemplary embodiment, the module support portion comprises a first module support portion positioned on the bottommost thereof, a second module support portion positioned in the middle thereof, and a third module support portion positioned on the topmost thereof, and receiving grooves divided into semicircles are formed at regular intervals on the top of the first module support portion and the bottom of the third module support portion, the receiving grooves are established at regular intervals on the top and bottom of the second module support portion, and the receiving grooves come in contact with the outer circumferential surface of the battery module by halves.

As another exemplary embodiment, the module support portion includes a plane portion formed in the vertical direction on one side thereof and an inclined surface portion established inclinedly to the plane portion at a predetermined angle on the other side of thereof, the module support portions are arranged as a front module support portion, a middle module support portion and a rear module support portion, supporting the front end portion, the middle portion and the rear end portion of the battery module, respectively, and the plane portions of the front and rear module support portions are arranged facing the outside, whereas, the middle module support portions are arranged in a manner that two plane portions thereof come in contact with each other and the inclined surface portions thereof are arranged facing the inclined surface portions of the front and rear module support portions.

Moreover, cutting portions are formed on the receiving grooves in the longitudinal direction of the module support portion.

Furthermore, the cutting amount of the cutting portions becomes larger from the upstream to the downstream of the cooling air so that the contact area between the battery module and the cooling air becomes larger through the cutting portions.

In addition, the receiving grooves formed on the top of the second module support portion are arranged crossed to the receiving grooves formed on the bottom of the second module support portion.

BRIEF DESCRIPTION OF THE DRAWINGS

The above and other features of the present invention will be described with reference to certain exemplary embodiments thereof illustrated the attached drawings in which.

DETAILED DESCRIPTION OF THE INVENTION

Hereinafter, exemplary embodiments of the present invention will now be described in detail with reference to the attached drawings.

Figure 1:
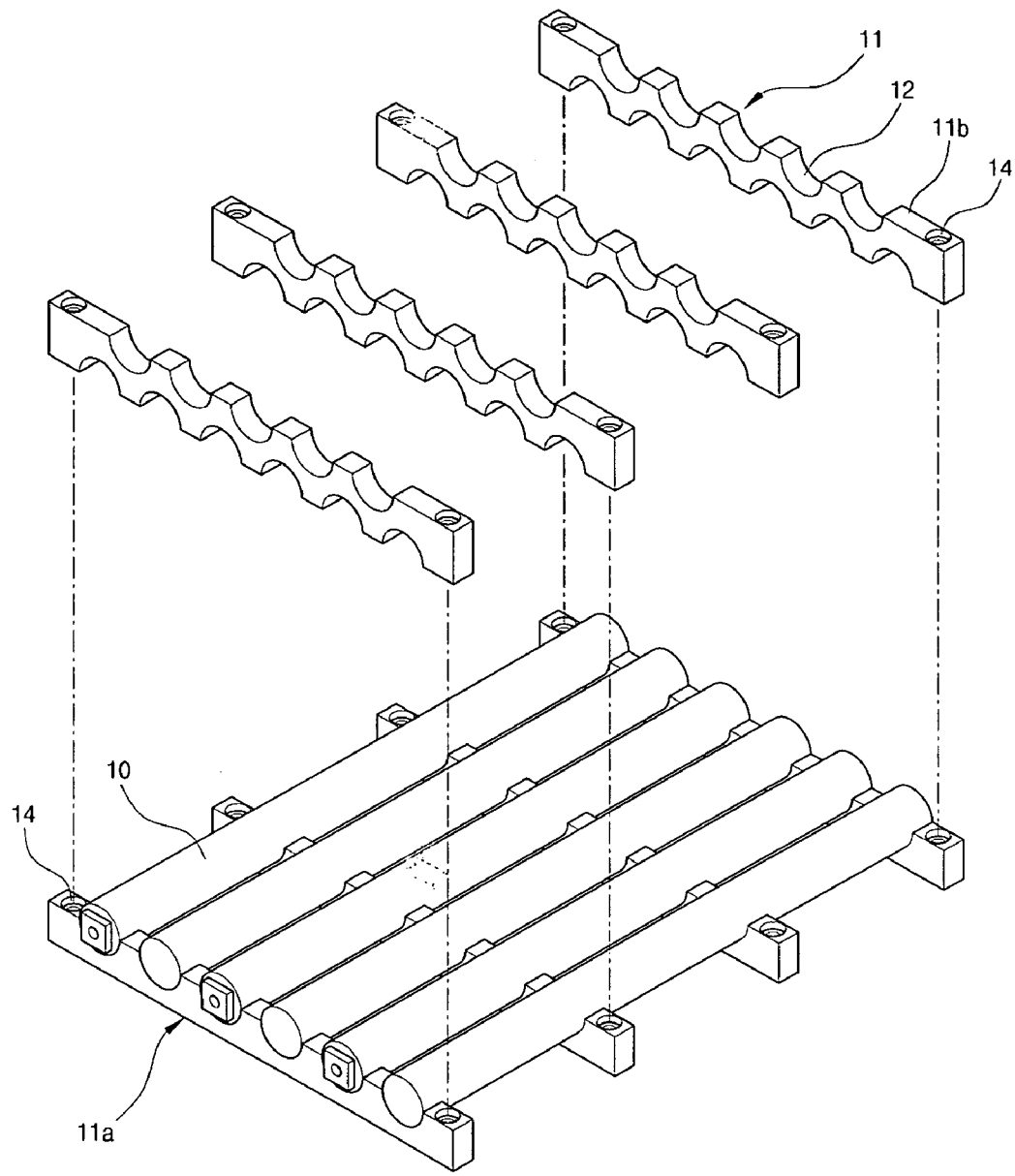
FIG. 1 is a perspective view depicting a holder for battery modules in accordance with an exemplary embodiment of the present invention.
Figure 2:
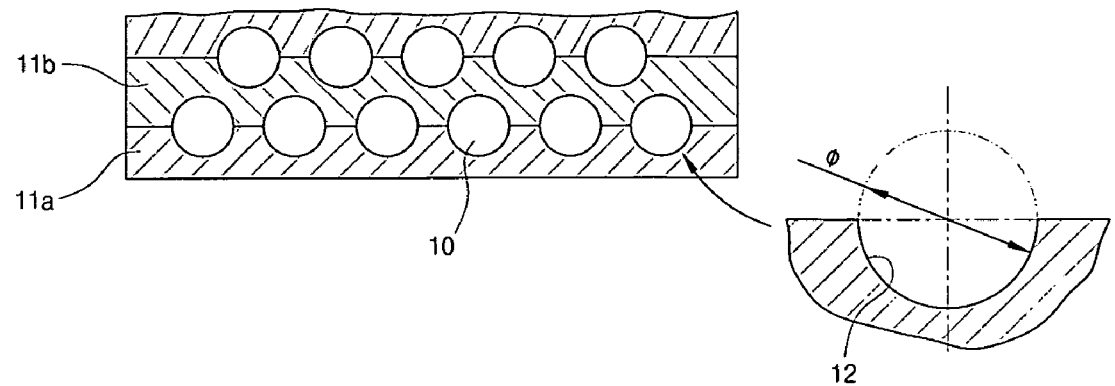
FIG. 2 is a side cross-sectional view depicting a holder for battery modules in accordance with an exemplary embodiment of the present invention.

As shown, for example in FIGS. 1 and 3, module support portions 11 and 110 supporting a battery module 10 (hereinafter referred to as the module) may be made of made of a resin or other similar, suitable material to have electrical insulation. Resin material can improve productivity also by providing for molding as a means of manufacture. The number of the module support portions 11 and 110 and stacked steps are set according to the number of the modules to be assembled therein.

A plurality of semicircular receiving recesses 12 is formed at regular intervals on the module support portions 11 and 110. A plurality of the module support portions 11 and 110 is arranged in the horizontal direction of the module 10. The outer circumferential surfaces of the modules 10 are put on the receiving recesses 12 to be supported.

The module support portion 110 comprises a first module support portion 110a positioned on the bottommost thereof, a second module support portion 110b stacked on the top of the first module support portion 110a, and a third module support portion 110c positioned on the topmost thereof.

The receiving recess 12 is not formed on the bottom surface of the first module support portion 110a and on the top surface of the third module support portion 110c. The receiving recesses 12 are established at regular intervals on the bottom and top surfaces of the second module support portion 110b. Here, receiving recesses 12 on the top surface are faced with those on the bottom surface crossed to each other, and the outer circumferential surfaces of the modules 10 are held on the receiving recesses 12 of the first and second module support portions 110a and 110b by halves.

The first to third module support portions 110a to 110c are stacked in identical forms and the width of the module support portion 110 becomes smaller from an inlet side to an outlet side of cooling air. That is, a plane portion is formed in a straight line on one side of the module support portion 110 and an inclined surface portion is established inclinedly to the plane portion at a predetermined angle on the other side of the module support portion 110.

Figure 3:
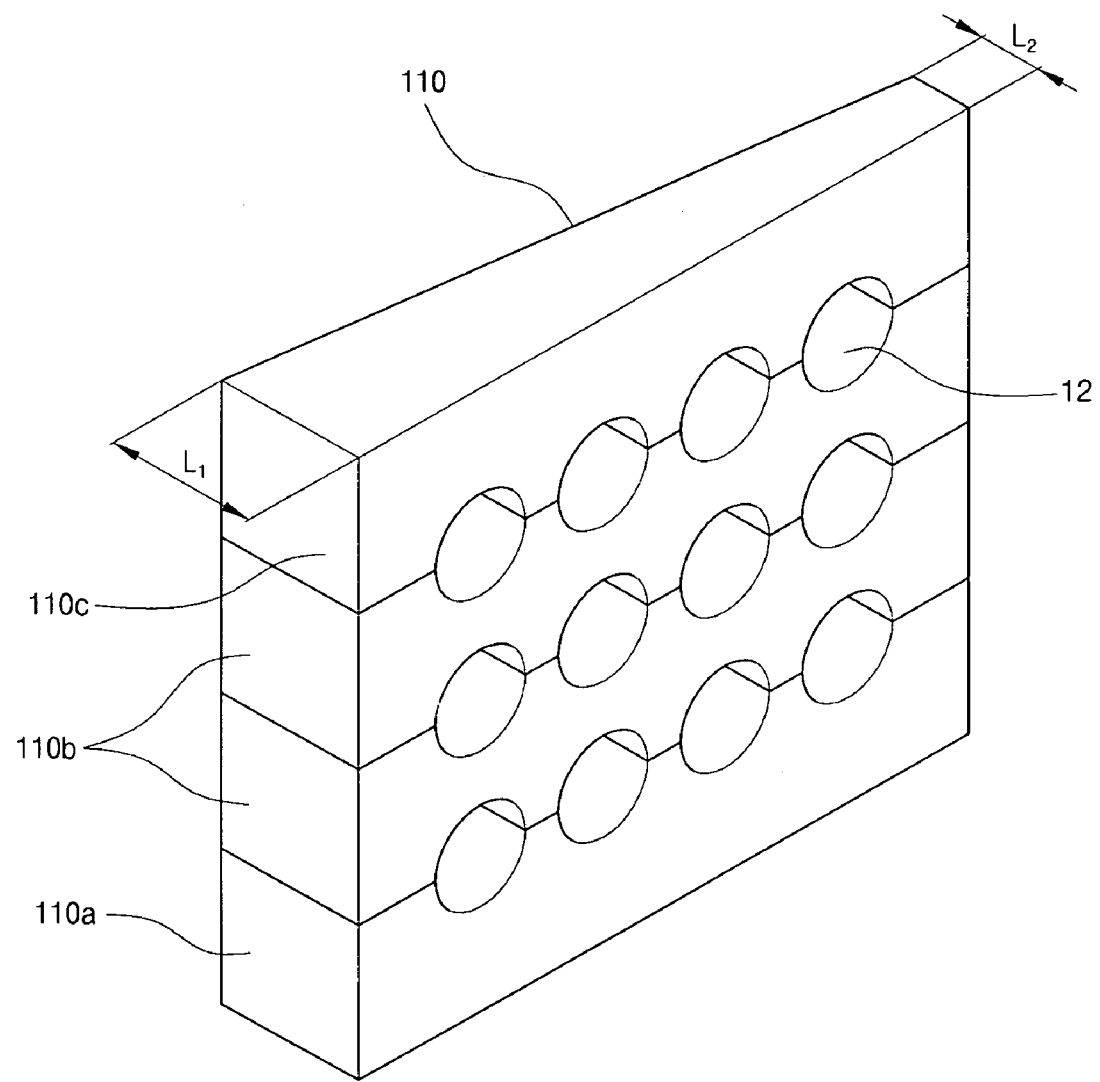
FIG. 3 is a perspective view depicting a module support portion in accordance with an exemplary embodiment of the present invention.
Figure 4:
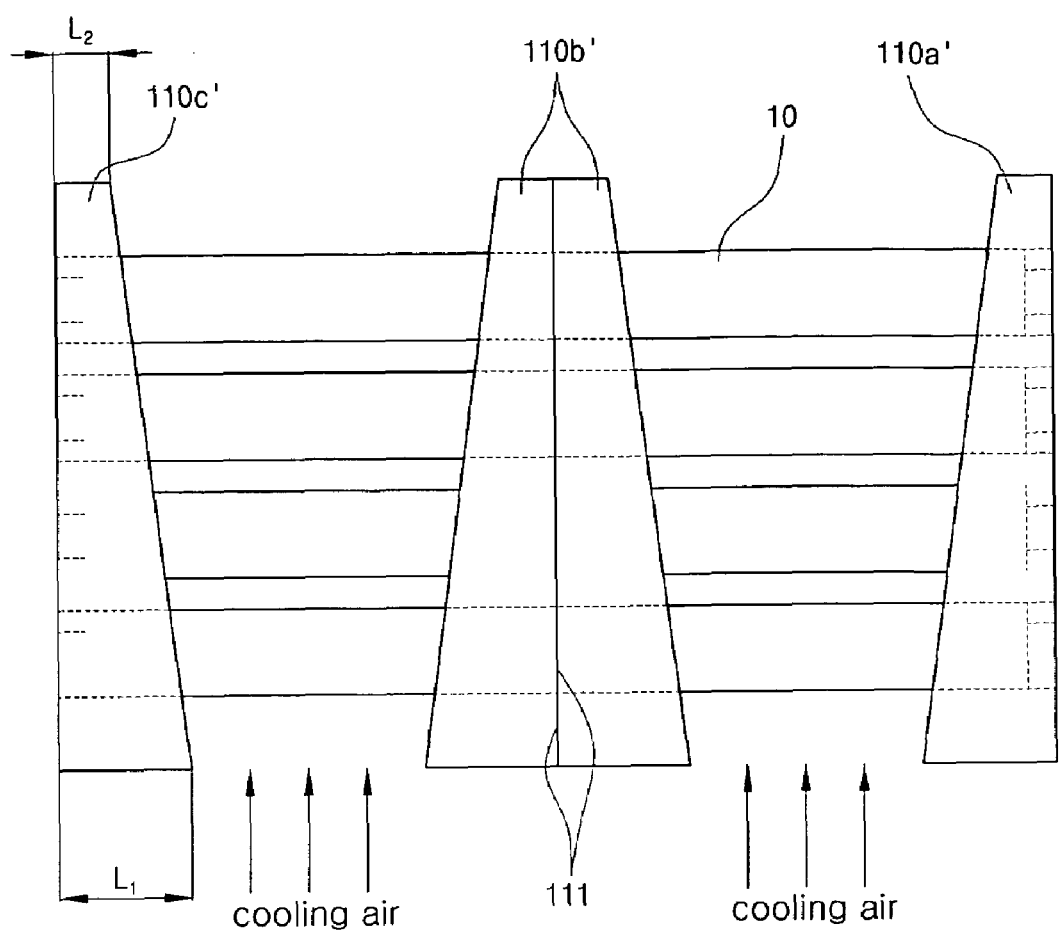
FIG. 4 is a perspective view depicting a holder for battery modules in accordance with another exemplary embodiment of the present invention.

The module support portion 110 in accordance with another exemplary embodiment is depicted in FIGS. 3 and 4, in which the width of the cooling air inlet side is L1 and that of the opposite side is L2. Here, L1 is greater than L2.

Moreover, the module support portion 110 comprises a front module support portion 110a' supporting the front end portion of the module 10, a middle module support portion 110b' supporting the middle portion of the module 10, and a rear module support portion 110c' supporting the rear portion of the module 10.

The plane portions of the front and rear module support portions 110a' and 110c' are arranged facing the outside, whereas, the middle module support portions 110b' are arranged in a manner that two plane portions 111 thereof come in contact with each other and the inclined surface portions are arranged facing the inclined surface portions of the front and rear module support portions 110a' and 110c'. In such a configuration, the relatively small space between the module support portions 110 corresponds to the cooling air inlet side and the relatively large space between the module support portions 110 corresponds to the cooling air outlet side.

Operation of holders for battery modules configured as described above in accordance with exemplary embodiments of present invention will be described as follows.

By designing the dimension of L1 larger than that of L2, the contact area of the cooling air of low temperature contacting to the modules 10 is decreased in the side of L1 (the upstream) and, on the contrary, the contact area of the cooling air contacting to the modules 10 becomes increased toward the side of L2 (the downstream). Accordingly, it is possible to maintain the temperature difference between the modules 10 from the upstream to the downstream of the cooling air below a specific value.

Figure 5A:
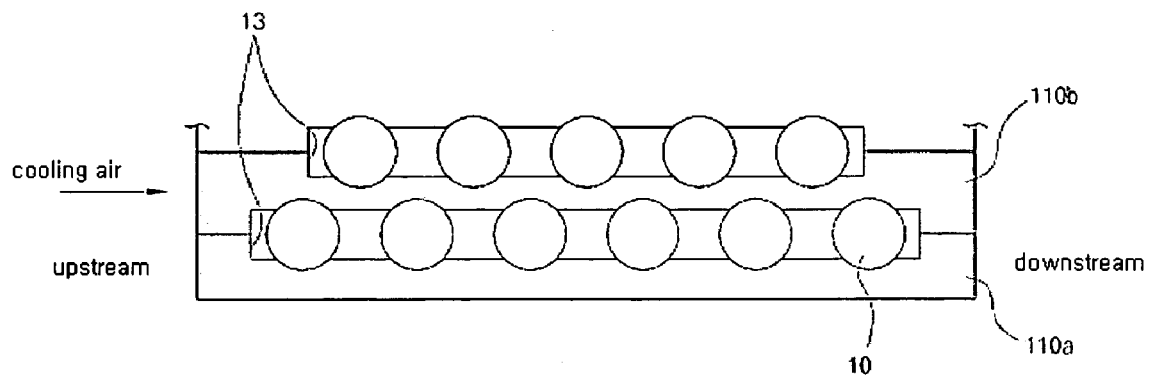
FIGS. 5a to 5c are side cross-sectional views depicting cutting portions of receiving recesses in accordance with exemplary embodiments of the present invention.
Figure 5B:
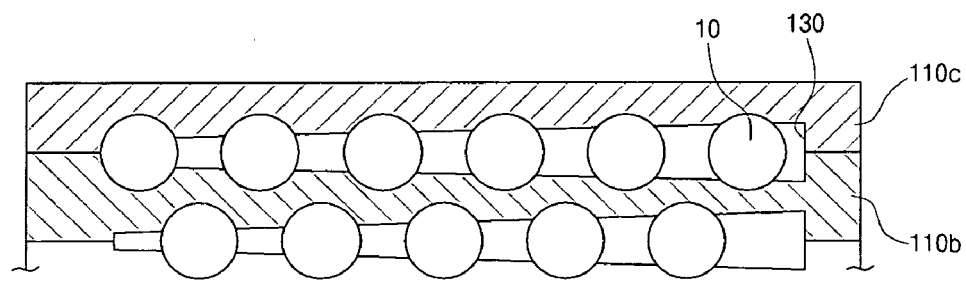
Figure 5C:
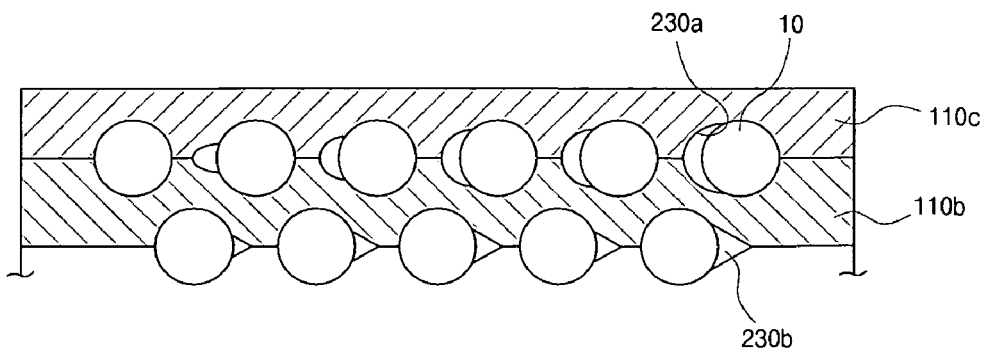

Moreover, as depicted in FIGS. 5a to 5c, cutting portions 13 and 130 are formed on receiving recesses 12 divided into semicircles. Here, the cutting amount of the module support portion 110 in the upstream of the cooling air is decreased and, on the contrary, the cutting amount of the module support portion 110 becomes increased toward the downstream. Accordingly, the contact area of the cooling air becomes larger from the upstream to the downstream, thus maintaining the temperature difference between modules 10 below a specific value. Furthermore, since the cooling structure of the present invention does not require dedicated parts such as rectifying member, guide groove and fin, the outside dimensions of the module support portion 110 as a cooling apparatus are not increased, thus ensuring downsizing, light-weighting, low cost and power saving.

Reference numerals 230a and 230b denote cutting portions and numeral 14 denotes a through-hole for connecting the stacked module support portions.

EXPERIMENTAL EXAMPLE

The following is the result of comparing temperature differences after cooling the modules in accordance with the present invention and the conventional art:

(1) Minimized Estimates of Temperature Differences between Modules

The experiment was carried out under the cooling conditions in which the airflow was 60 m$^3$/h and the heat-generation amount was 5 W/module.

In case of a conventional holder (L1=L2), the maximum temperature of the module was 35.3° C., the minimum temperature of the module was 29.4° C. and thereby the temperature difference was 5.9° C.

In case of a holder of the present invention (L1>L2) corresponding to that of FIG. 4, the maximum temperature of the module was 34.0° C., the minimum temperature of the module was 31.1° C. and thereby the temperature difference was 2.9° C.

(2) Minimized Estimates of Temperature Differences between Modules

The experiment was carried out under the cooling conditions in which the airflow was 150 m$^3$/h and the heat-generation amount was 21 W/module.

In case of a conventional holder (having no cutting portion), the maximum temperature of the module was 48.5° C., the minimum temperature of the module was 39.4° C. and thereby the temperature difference was 9.1° C.

In case of a holder of the present invention (having the cutting portions 13 and 130), the maximum temperature of the module was 44.0° C., the minimum temperature of the module was 39.0° C. and thereby the temperature difference was 5.0° C.

According to the results of (1) and (2), it is assumed that the lifetime of the battery will be prolonged about 15%.

As described above, according to the holder for battery module in accordance with the present invention, the width of the module support portion including the receiving recesses divided into semicircles becomes smaller from the upstream to the downstream of the cooling air, and the cutting amount of the receiving recesses becomes larger from the upstream to the downstream of the cooling air. Accordingly, the contact area of the cooling air and the modules are increased toward the downstream of the cooling air, thus maintaining the temperature difference between the modules below a specific value.

Moreover, since the conventional dedicated parts, such as rectifying member, guide groove and fin, for the purpose of the cooling are not required in the present invention, it is possible to reduce the cost and the power consumption considerably, prolong the lifetime of the battery modules and prevent fluctuations of lifetime of the modules.

As above, preferred embodiments of the present invention have been described and illustrated, however, the present invention is not limited thereto, rather, it should be understood that various modifications and variations of the present invention can be made thereto by those skilled in the art without departing from the spirit and the technical scope of the present invention as defined by the appended claims.

What is claimed is:

1. A holder for battery modules, comprising:
a module support portion supporting a plurality of battery modules; and
a plurality of receiving recesses, formed at regular intervals on the module support portion, on which the battery modules are put,
wherein the module support portions support both end portions or a front end portion, a middle portion and a rear end portion of the battery module,
wherein, said module support portions are configured and dimensioned for stacking such that if the number of the battery modules exceeds a capacity that a step of the battery module can accommodate, battery modules are stacked in plural steps and then electrically and mechanically connected to one another, and
wherein the cross-sectional area of the module support portion is decreased toward the downstream of cooling air so that a contact area between the battery module and the cooling air becomes larger from the upstream to the downstream of the cooling air.

2. The holder for battery module as recited in claim 1, wherein:
the module support portion comprises a first module support portion positioned at a bottommost thereof, a second module support portion positioned at a middle thereof, and a third module support portion positioned at a topmost thereof, and
receiving grooves divided into semicircles are formed at regular intervals on the top of the first module support portion and the bottom of the third module support portion, the receiving grooves being established at regular intervals on the top and bottom of the second module support portion, and the receiving grooves in contact with the outer circumferential surface of the battery module by halves.

3. The holder for battery module as recited in claim 1 or 2, wherein:
the module support portion includes a plane portion formed in the vertical direction on one side thereof and an inclined surface portion established inclinedly to the plane portion at a predetermined angle on the other side of thereof;
the module support portions are arranged as a front module support portion, a middle module support portion and a rear module support portion, supporting the front end portion, the middle portion and the rear end portion of the battery module, respectively; and
the plane portions of the front and rear module support portions are arranged facing the outside, whereas, the middle module support portions are arranged in a manner that two plane portions thereof come in contact with each other and the inclined surface portions thereof are arranged facing the inclined surface portions of the front and rear module support portions.

4. The holder for battery module as recited in claim 3, wherein cutting portions are formed on the receiving grooves in the longitudinal direction of the module support portion.

5. The holder for battery module as recited in claim 4, wherein the cutting amount of the cutting portions becomes larger from the upstream to the downstream of the cooling air so that the contact area between the battery module and the cooling air becomes larger through the cutting portions.

6. The holder for battery module as recited in claim 2, wherein the receiving grooves formed on the top of the second module support portion are arranged crossed to the receiving grooves formed on the bottom of the second module support portion.

* * * * *